(12) United States Patent
Leow et al.

(10) Patent No.: US 10,934,090 B2
(45) Date of Patent: Mar. 2, 2021

(54) HIGH DENSITY MANUFACTURING CELL (HDMC) STRUCTURE OR THE LIKE

(71) Applicant: AKRIBIS SYSTEMS PTE LTD, Singapore (SG)

(72) Inventors: Yong Peng Leow, Singapore (SG); Chun Seng Yong, Singapore (SG)

(73) Assignee: AKRIBIS SYSTEMS PTE LTD, Singapore (SG)

( * ) Notice: Subject to any disclaimer, the term of this patent is extended or adjusted under 35 U.S.C. 154(b) by 113 days.

(21) Appl. No.: 16/340,330

(22) PCT Filed: Mar. 28, 2017

(86) PCT No.: PCT/SG2017/050156
§ 371 (c)(1),
(2) Date: Apr. 8, 2019

(87) PCT Pub. No.: WO2018/182500
PCT Pub. Date: Oct. 4, 2018

(65) Prior Publication Data
US 2019/0225423 A1    Jul. 25, 2019

(51) Int. Cl.
G06F 7/00       (2006.01)
B65G 1/04       (2006.01)
B65G 1/133      (2006.01)
B65G 47/90      (2006.01)

(52) U.S. Cl.
CPC .......... *B65G 1/045* (2013.01); *B65G 1/133* (2013.01); *B65G 47/905* (2013.01)

(58) Field of Classification Search
CPC ....... B65G 1/045; B65G 1/133; B65G 47/905
USPC ................... 700/213–214, 218, 208, 230
See application file for complete search history.

(56) References Cited

U.S. PATENT DOCUMENTS

| | | | | |
|---|---|---|---|---|
| 2,166,461 A | * | 7/1939 | Carlson | B24B 27/0023 451/401 |
| 6,326,755 B1 | * | 12/2001 | Babbs | B25J 18/04 318/568.21 |
| 2016/0175908 A1 | * | 6/2016 | Obinata | B21D 7/024 72/159 |

* cited by examiner

Primary Examiner — Yolanda R Cumbess
(74) Attorney, Agent, or Firm — WPAT, PC

(57) ABSTRACT

A high density manufacturing cell or carousel for optimizing floor space usage to reduce equipment footprint and material travel path is disclosed. The carousel allows processing and transferring of products to be concurrently performed, minimising non-productive time. The manufacturing cell or carousel comprises: (a) a plurality of rotary platforms, (b) a plurality of vertical moving platforms, (c) a vertical walking beam, and (d) a load gripper and a unload gripper mounted to independent robots.

16 Claims, 16 Drawing Sheets

US 10,934,090 B2

HIGH DENSITY MANUFACTURING CELL (HDMC) STRUCTURE OR THE LIKE

FIELD OF THE INVENTION

The present invention relates to a cell structure, or an assembly or carousel or the like of manufacturing, and in particular, to an assembly or the like to optimise floor space usage though reduction of machine footprint and material travel path.

BACKGROUND OF THE INVENTION

The present invention is related to a manufacturing assembly or carousel, and in particular, a high density manufacturing cell which is designed to perform a series of manufacturing processes concurrently within the same assembly or carousel while transferring of products in preparation for the next cycle is being performed.

US Patent Publication No. 2011/0047791 entitled "Manufacturing System" discloses a manufacturing system comprising a plurality of work stations having one or more tools for processing a work item, at least one carrier for moving a work item, and a platform for connecting the plurality of work stations. The platform may preferably comprises at least one rotator for changing the direction of movement of the at least one carrier on the platform. The system may also comprise at least one conveyer for transporting the at least one carrier to the platform.

U.S. Pat. No. 4,823,929 entitled "Multi-Station Assembly Machine" discloses a modular assembly line apparatus for automatically assembling multiple component devices, such as sprinkler units and the like, includes a central support table including upper and lower reference rails for mounting assembly fixtures, and mechanism, high and low pressure air manifolds, a conveyor and multiple station pallet stops and support fixtures for selectively stopping and supporting work pieces for assembly functions.

U.S. Pat. No. 7,698,015 entitled "Integrated Back-end Integrated Circuit Manufacturing Assembly" relates to a front-of-line portion comprising a plurality of integrated sub-stations for operating on a first plurality of die-strips on an in-line basis to produce a second plurality of die-strips. The assembly also provides camera systems perform automated visual inspection of dies on the die strip and maintain a database that can be used for automated reject management.

PCT Application No. PCT/JP2014/068732 entitled "Assembly Line Organizing System And Assembly Line Organizing Method" discloses an organization of an assembly line to assemble a product to be assembled. The assembly steps are created on the basis of 3D CAD information and production conditions of a product to be assembled, a plurality of automation proposals are generated for the created assembly steps, the required number of workers and required number of pieces of equipment in the assembly line are calculated for the generated plurality of automation proposals to calculated assembly cost, and information on the automation rate, labour cost and equipment repayment cost of the automation proposal with the lowest calculated assembly cost among the plurality of automation proposals is outputted.

PCT Application No. PCT/US98/08811 entitled "Dynamically Reconfigurable Assembly Line For Electronic Products" relates to a method of reconfiguring a production line for fabricating printed circuit board assemblies to achieve maximum efficiency and maximum flexibility. The production line has one or more placement stations, a reflow oven, a conveyor and a controller. The controller communicates with the various components of the production line to transfer information related to the state of assembly of some of the printed circuit board assemblies that are being processed.

In manufacturing industries of consumer products, speed and efficiency of production is crucial in attaining high manufacturing output. A cellular manufacturing mechanism or carousel allows simple changes to the production line to be made precisely and rapidly, allowing a variety of scaling for a product or even accommodating to a different design. The advantages of cellular manufacturing mechanism are reduction of number of machine and process breakdowns, flow distance and time, floor spacing required, and increase in output per man hour.

Cellular manufacturing as a part of lean manufacturing is an approaching taken to address to challenges of efficiency and flexibility in manufacturing. The production facility would consist of several cells each performing a set of operation or a hybrid of operations with functional layouts within the cell. The design for a cellular manufacturing facility considers the types of operations required for a product, resource that will be used and information required within cells, between cells and external departments. Hence the required operations define the boundaries of each cell and the flow of information and resource required for internal and external coordination defines the relationship between the cells.

The present high density manufacturing cell provides a replacement for a plurality of machines to perform a set of operations to one unit. Any one unit is capable of picking products from a conveyor and performs a series of operations or processes before returning it to the conveyor or transferring it to another high density manufacturing cell for further processes to be carried out.

SUMMARY OF THE INVENTION

Accordingly, the present invention is to provide a high density manufacturing cell or carousel which is used for product handling and manufacturing processes performed simultaneously. High speed and high density in handling product is achieved by having simultaneous transferring of products and processes performed, and stacking of platforms vertically. The cell is flexible to be used as a single unit or two or more cells are linked together, which provides versatility for process and layout planning.

An object of the present invention is to provide a high density manufacturing cell or carousel for optimizing floor space usage to reduce equipment footprint and material travel path comprising (a) a plurality of rotary platforms attached to a rotatable shaft positioned vertically in the middle of the cell and being rotatable about the central axis thereof;

(b) a plurality of vertical moving platforms attached to an external cylindrical housing, being mounted substantially perpendicularly to the external cylindrical housing, wherein the cylindrical housing can be raised and lowered;

(c) a vertical walking beam located outside of the cylindrical housing of the manufacturing cell comprising of a number of arms attached to a vertical beam, wherein the vertical arms transfer units across the rotary platforms by picking up the product and moving them vertically across to another rotary platform;

(d) an unload gripper and a load gripper transferring products in between the manufacturing cell and the conveyor, wherein the manufacturing cell is positioned next to a conveyor which conveys unprocessed products to the cell and processed products away from the cell, and the unload gripper is positioned at the level of the top platform to unload processed products from the topmost rotary platform onto the conveyor and the load gripper is positioned at the level of the bottommost platform to load products from the conveyor onto the bottom platform for processing.

Still another object of the present invention is to provide a method of loading and unloading processed product using the high density manufacturing cell comprising the step of (i) moving the vertical moving platforms upwards to allow the processing of products to begin at the workstations which are attached to a separate stationary external cylindrical housing;

(ii) triggering the unload gripper to pick processed product from the top most rotary platform while the vertical walking beam lowers the grippers to the lower tier platforms to pick the partially completed products from each platform;

(iii) returning the unload gripper back to its standby position thereof after the unload gripper places the processed products onto the conveyor, and the vertical walking beam picks the products from the lower tier platforms;

(iv) moving the vertical walking beam into the upper tier platforms to place the products, while the load gripper is holding on an unprocessed product picked from the conveyor, places the unprocessed product onto the bottom platform;

(v) returning the vertical walking beam to the original position and moving the load gripper to the conveyor to pick a new product;

(vi) returning the load gripper to its standby position, and lowering all processed products within the system on to the rotary platforms;

(viii) moving all products by an index by the rotary platforms from to one station to another station and raising the vertical moving platform to lift the products while a new set of products to be transferred remains on the rotary platform, within the transfer zone for unloading.

The cell is designed as carousel, integrated with a vertical walking beam, a loading and unloading gripper. A plurality of work stations are formed on an cylindrical structure independent of the external cylindrical housing, which is designate to perform a particular process. Every product is transferred from one work station to another work station, performing a process to accomplish a plurality of scheduled sequences of processes within the carousel.

The present invention provides a high density manufacturing cell or carousel comprising: a plurality of layers of vertical platforms coupled to an external cylindrical housing with equal pitch between them, and a plurality of layers of rotary platforms coupled together to a common shaft with an equal pitch as the rotary platforms. The rotary platforms rotate about an axis common to the vertical moving platforms. Each vertical moving platform is provided with an equal number of product holders arrange in circular, with equal angular spacing, holding a plurality of products in place while processes are taking place. Both the rotary and vertical moving platforms has an equal number of product holders spaced at a similar angular and vertical spacing.

The vertical walking beam of the present invention is provided with grippers attached to a beamlike structure used to transfer products vertically between platforms. The number of grippers required is one less than the number of platforms within the cell. The vertical walking beam is positioned outside of the carousel with a vertical motion parallel to the axis of the carousel and horizontal motion to move its end effectors into and out of the carousel. The combination of vertical and horizontal motion effects the transfer of the products between the platforms.

The loading of product and unloading of a processed product in the present high density manufacturing cell are performed by loading and unloading robots and the products are directly picked from or loaded onto conveyors. The present high density manufacturing cell is positioned next to a conveyor and completed products are unloaded from the rotary platforms. The grippers of the vertical walking beam concurrently picks the processed products from the rotary platforms and transfers them to the next platform level. After all working stations have completed their respective processes, the vertical moving platform moves downwards and lowers all products on to the rotary platforms. The rotary platform would then rotate all products, including the newly transferred products by an angular pitch, directly beneath a new working station. The vertical moving platform would then lift all products off the rotary platform for the respective processes to be performed on the products by the working station.

In accordance with the present invention, in the course of processing the products, the unloading robot unloads the completed processed products, the walking beam transfers the products vertically between the platforms, and the loading robot loads a new product directly onto the rotary platforms.

BRIEF DESCRIPTION OF THE DRAWINGS

The present invention will now be described by way of example, with reference to the annexed drawings, in which.

DETAILED DESCRIPTION OF THE PREFERRED EMBODIMENTS

Hereinafter, there are described preferred embodiments of the present invention.

Figure 1A:
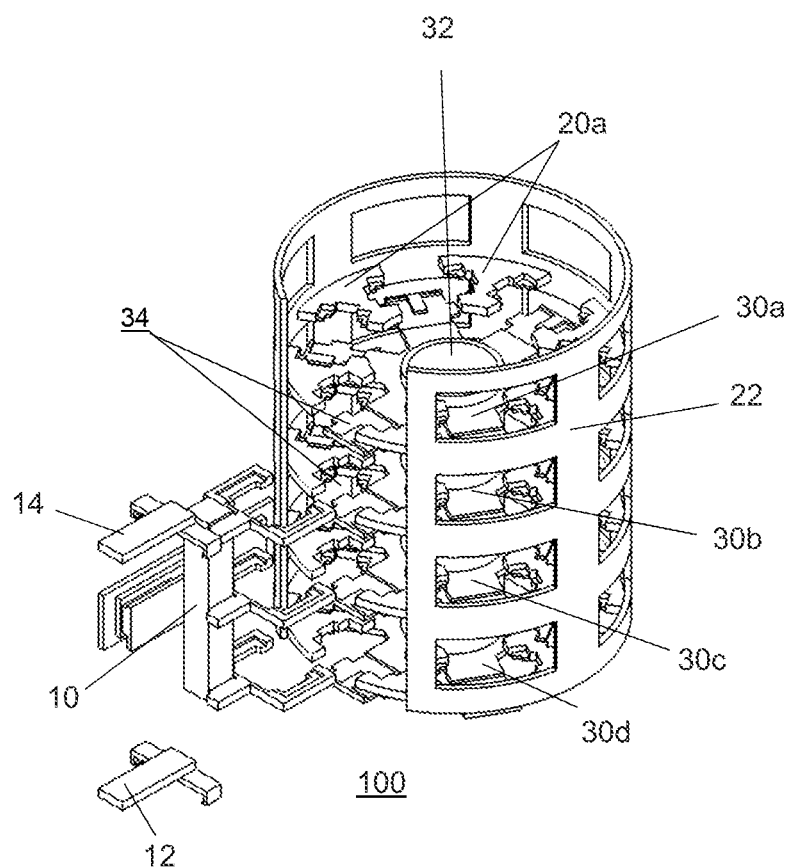
FIG. 1a illustrates a perspective view of a high density manufacturing cell without the workstations attached in accordance with the present invention.
Figure 1B:
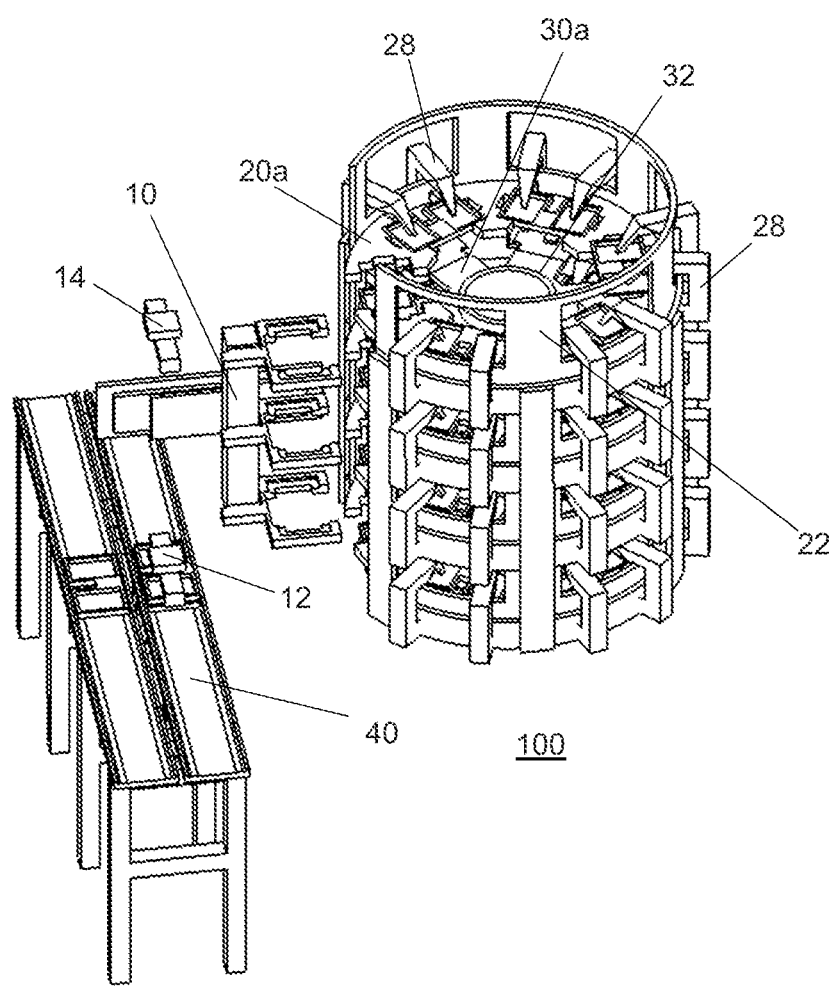
FIG. 1b illustrates a perspective view of a high density manufacturing cell having mounted beside a conveyor in accordance with the present invention.

Referring to FIG. 1a, a high density manufacturing cell 100 designed for product handling and manufacturing processes to be performed simultaneously according to the present invention is disclosed. FIG. 1b is a perspective view showing the high density manufacturing cell 100 with a conveyor 40 mounted beside the cell 100 in accordance with the present invention. The high density manufacturing cell or carousel 100 comprises (a) a vertical walking beam 10 with a load gripper 12 (shown in FIG. 1b) and an unload gripper 14 (shown in FIG. 1b) positioned in the mid position of the carousel 100, (b) a plurality of vertical moving platforms 20a, 20b, 20c, 20d (shown in FIG. 2) attached at one edge thereof to an external cylindrical housing 22, each of the platforms 20a, 20b, 20c, 20d (FIG. 1a) being parallel to each other, and are equally spaced apart, (c) a plurality of rotating platforms 30a, 30b, 30c, 30d held together axially by a cylindrical shaft 32, positioned at the centre of the high density manufacturing cell 100, and (d) a conveyor 40 positioned beside the high density manufacturing cell 100. In a preferred embodiment, the high density manufacturing cell 100 is a carousel comprising of a plurality of vertically arranged platforms being attached to an external cylindrical housing 22, allowing these platforms to be moved vertically altogether, and a plurality of rotating platforms being attached to a central cylindrical shaft 32. In accordance with the present invention, the vertical moving platforms 20a, 20b, 20c, 20d have equally spaced vertical pitch between platforms 20 and equally spaced angular pitch between each unit holders thereof. The centre cylindrical shaft 32 is rotatable. When the cylindrical shaft 32 is rotated, the platforms 20 (20a, 20b, 20c, 20d) together with all the products are rotated. Along the vertical length of the carousel, the transferring of the products takes place along a single vertical row, also described as a transfer zone 34. Positioned directly opposite of the transfer zone 34 is the vertical walking beam 10 which can move up and down vertically as well as into and out of the carousel 100, the load gripper 12 for picking up product or component to be processed from the conveyor 40 is shown in FIG. 1b and the unload gripper 14 for unloading a fully processed component out of the carousel and placing it onto the conveyor 40 is shown in FIG. 1b.

Figure 15:
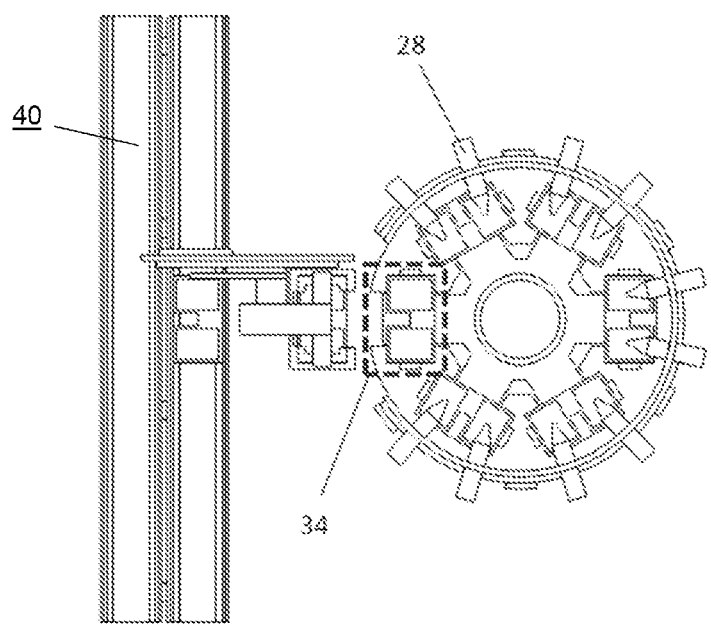
FIG. 15 is a top view of the high density manufacturing cell illustrating a vertical zone on the rotating platform allocated as the transfer zone in accordance with the present invention.

As shown in FIGS. 1a and 1b, the rotating platforms 30 (30a, 30b, 30c, 30d) are mounted to the external cylindrical housing 22, and the rotating platforms 30 has an equally spaced vertical pitch and equally spaced angular pitch between unit holders similar to the vertical moving platforms 20 (20a, 20b, 20c, 20d). A vertical zone on the rotating platform 30 is allocated as the transfer zone 34 (shown in FIG. 15), wherein processed products are moved out of the carousel 100, and the products would be moved between platforms, and new products would be loaded into the carousel 100.

Figure 2:
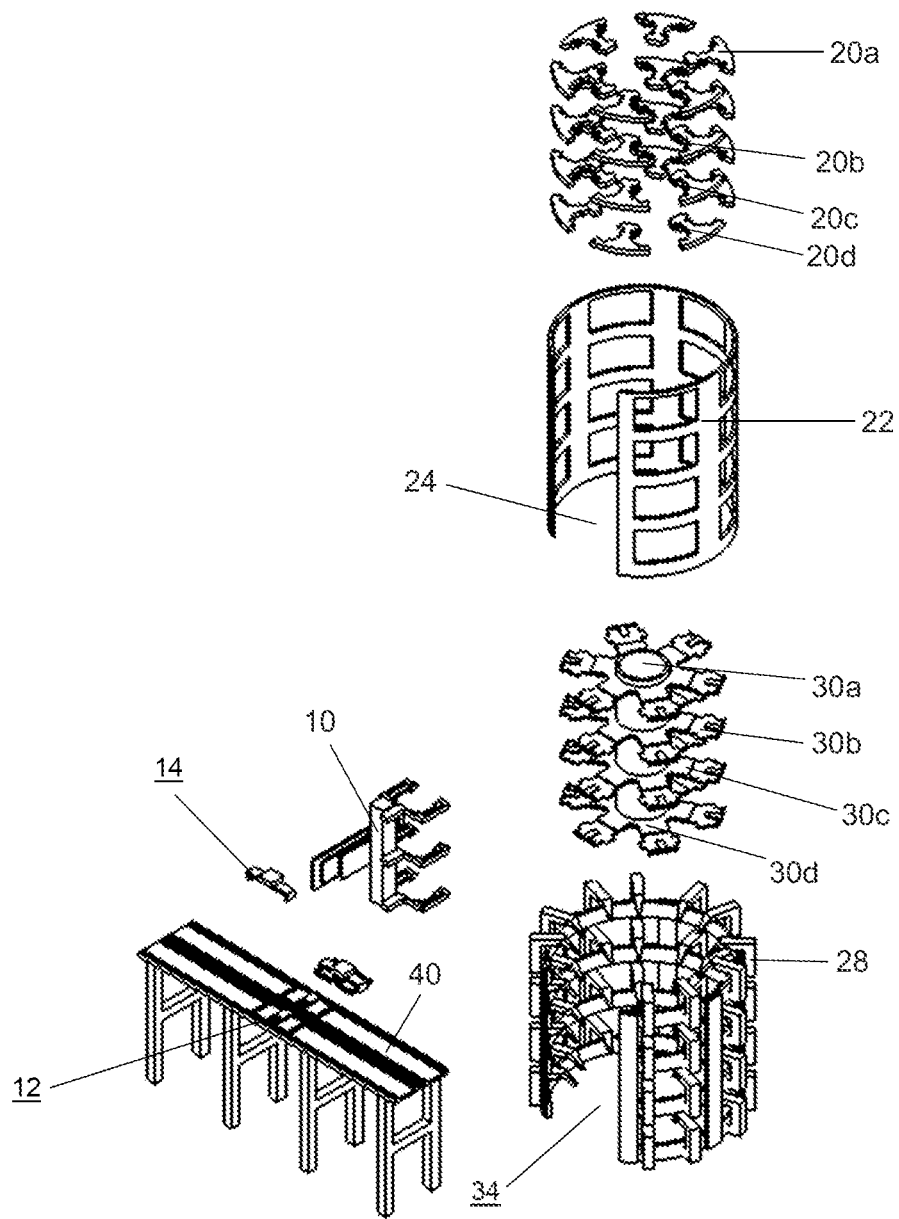
FIG. 2 is a perspective exploded view of a high density manufacturing cell showing a plurality of platforms in accordance with the present invention.
Figure 3A:
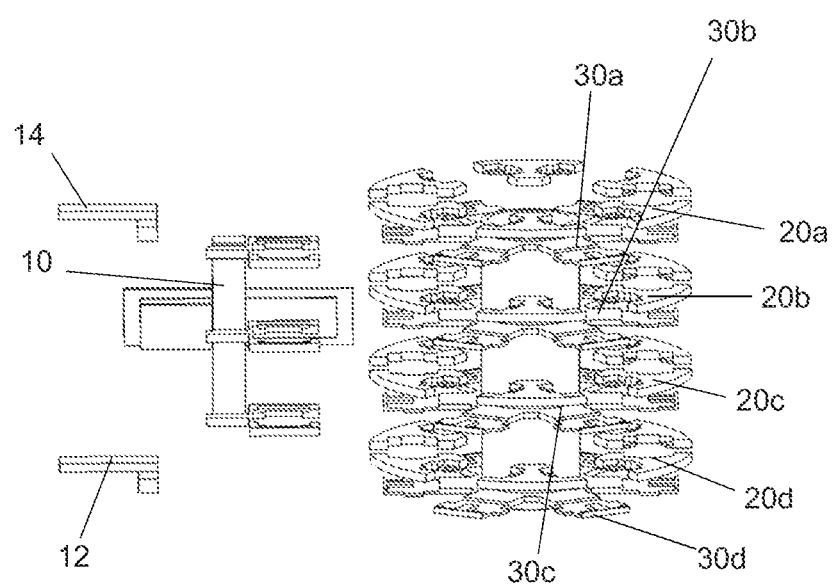
FIG. 3a illustrates the assembly of the rotary and vertical moving platforms in the high density manufacturing cell.

FIG. 2 is a perspective exploded view of a high density manufacturing cell in accordance with the present invention. A longitudinal opening 24 is made to the external cylindrical housing 22 along the transfer zone 34 to allow the picking and the placing of products into the carousel 100. In the preferred embodiment, the vertical walking beam 10 in front of the transfer zone 34 is provided to pick product through a bottom-up motion and place product through a top-down motion, or any form of picking and/or loading products. The load gripper 12 is positioned at height of the bottommost rotary platform 30a and the unload gripper 14 is positioned at height of the topmost rotary platform 30d. The load gripper 12 and the unload gripper 14 place and pick product from a position directly above of the product. FIG. 3a shows a perspective schematic view of the vertical moving platforms 20 raised above the rotary platform 30, and the vertical walking beam 10 and the grippers 12, 14 are at home position in accordance with the present invention.

Figure 3B:
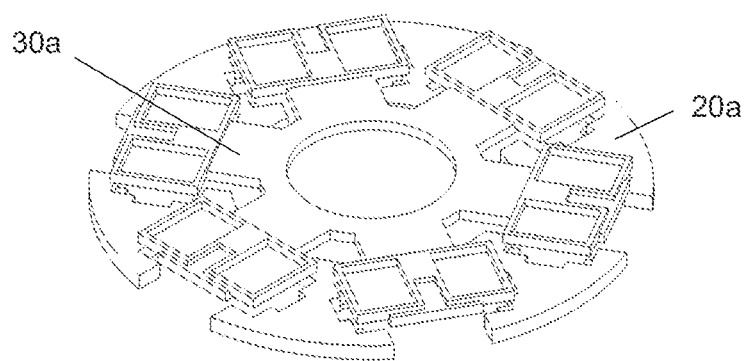
FIG. 3b is a perspective view showing the vertical moving platform moved down and products resting on the rotary platform being able to perform an angular indexing of the product in accordance with the present invention.
Figure 3C:
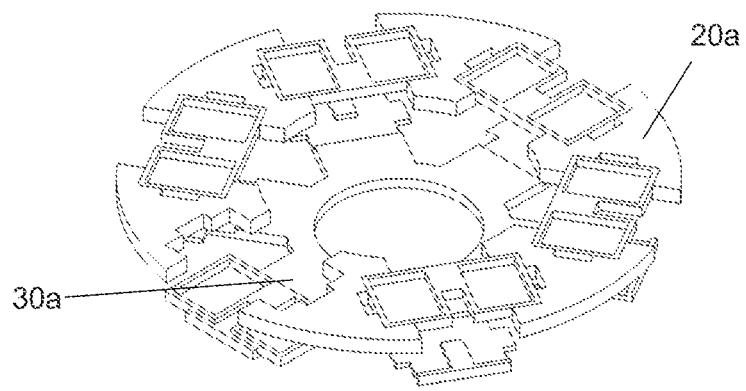
FIG. 3c is a perspective view showing vertical moving platform moved upwards and all products except those in the transfer zone being lifted away from the rotary platform in accordance with the present invention.

FIG. 3b is a perspective view showing the vertical moving platform 20 moved down and products resting on the rotary platform 30 being able to perform an angular indexing in accordance with the present invention. FIG. 3c is a perspective view showing the vertical moving platform 20 moved upwards and products except those in the transfer zone 34 being lifted away from the rotary platform 30 in accordance with the present invention.

Figure 4:
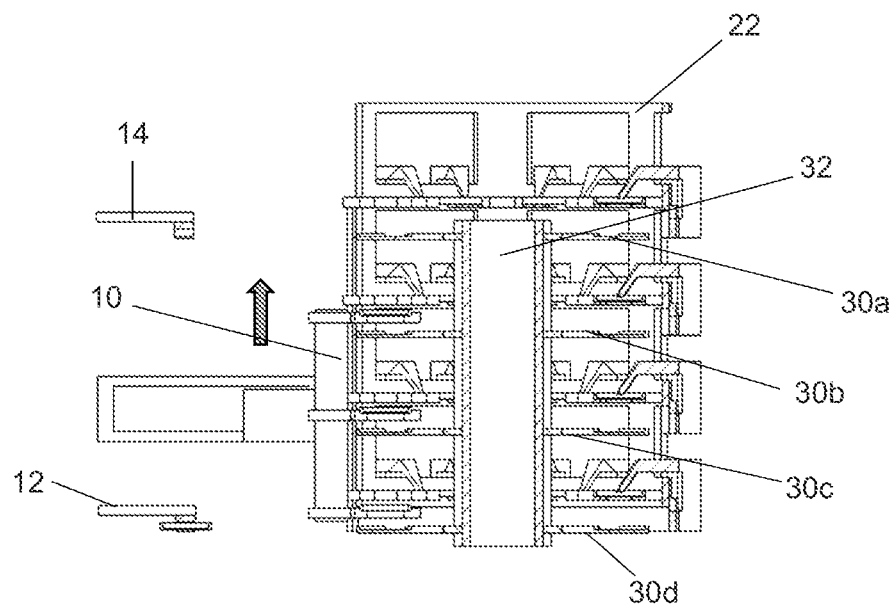
FIG. 4 is a section view showing the vertical walking beam lifting products from the rotary platform of the present invention.

FIG. 4 is a section view showing the vertical walking beam 10 lifting products from the rotary platform 30a-30d in accordance with the present invention. As shown in the figure, the unload gripper 14 removes a product from the carousel 100 and places the product onto the conveyor 40. The vertical walking beam 10 moves upwards to pick the products from the rotary platforms 30a-30d.

Figure 4A:
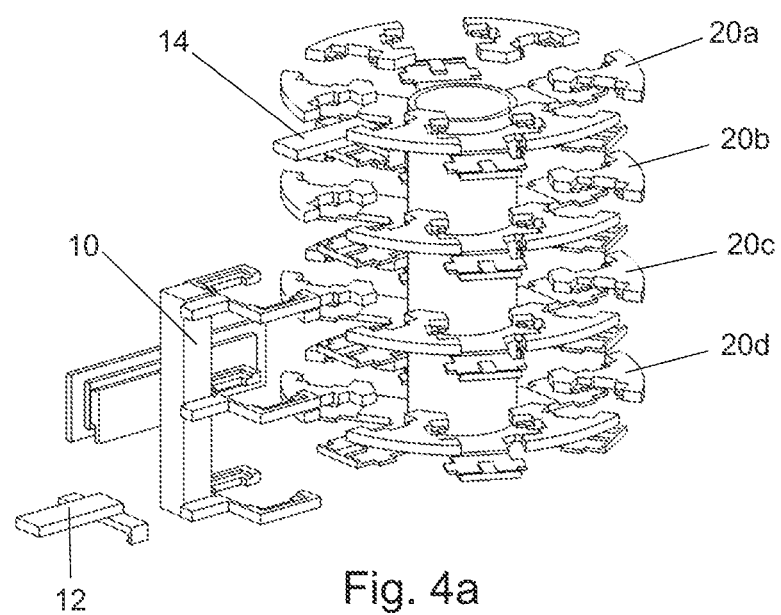
FIGS. 4a to 4g illustrate the steps (in perspective views) of loading of product for processing and unloading of processed products of the high density manufacturing cell in accordance with the present invention.

FIG. 4a is a perspective view showing the unload gripper 14 entering the carousel 100 to unload a completed processed product from a rotary platform 30a, and the vertical walking beam 10 moves to a lower position, aligned below the rotary platform 30b in accordance with the present invention. Referring to FIG. 4a, the fully processed product at the topmost level of the rotary platform 30a is first removed by the unload gripper 14. The unloading gripper 14 enters the carousel 100 and picks the product from the top most level of the transfer zone 34, while the vertical walking beam 10 moves downwards and aligns its grippers at a height below the resting positions of the remaining products below the topmost level.

Figure 4B:
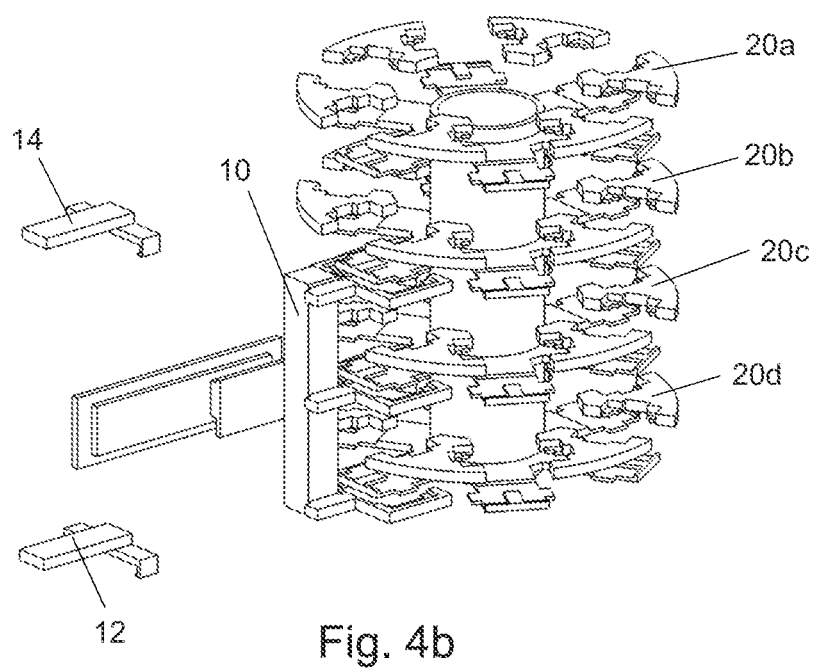

As shown in FIG. 4b, the unload gripper 14 extracts a completed/processed product from the carousel 100, and the vertical walking beam 10 enters the carousel 100, positioning its grippers directly beneath the products.

Figure 4C:
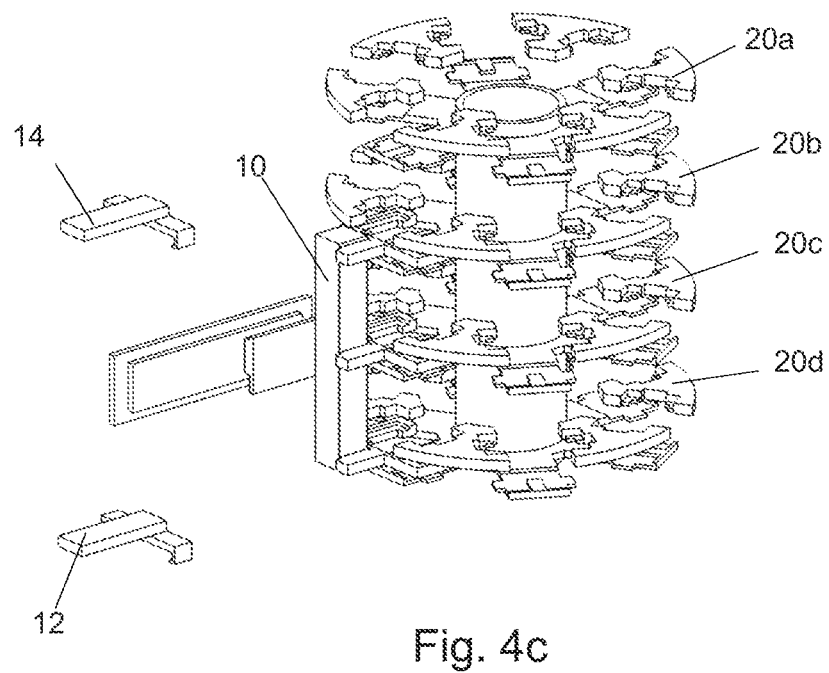

FIG. 4c is a perspective view showing the vertical walking beam 10 picking products from the rotating platform 30 in accordance with the present invention. The vertical walking beam 10 moves upwards, transferring the products from the rotating platform 30 to the grippers of the vertical walking beam 10.

Figure 4D:
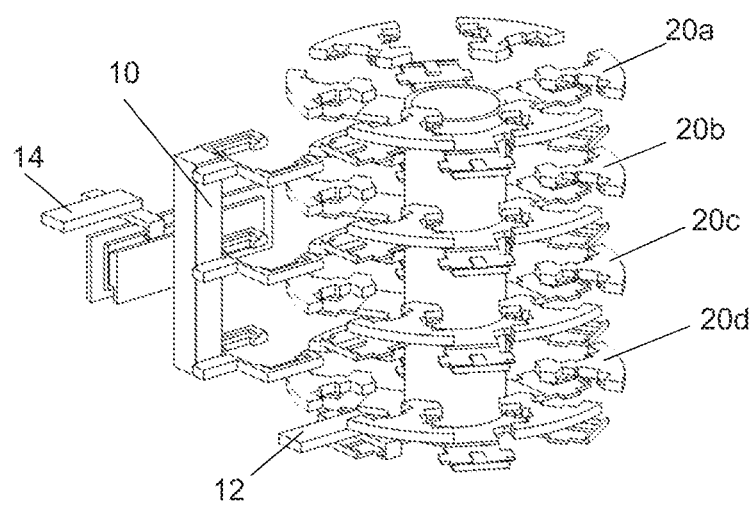

FIG. 4d is a perspective view showing the vertical walking beam 10 moving to the upper tier platforms with arms aligned to the top of the rotary platform 30 and the loading gripper 12 loading a new product onto the rotary platform 30 in accordance with the present invention. As shown in the figure, the vertical walking beam 10 moves out of the carousel 100 and moves upwards to the upper position and positions its grippers above the top tier rotating platforms.

Figure 4E:
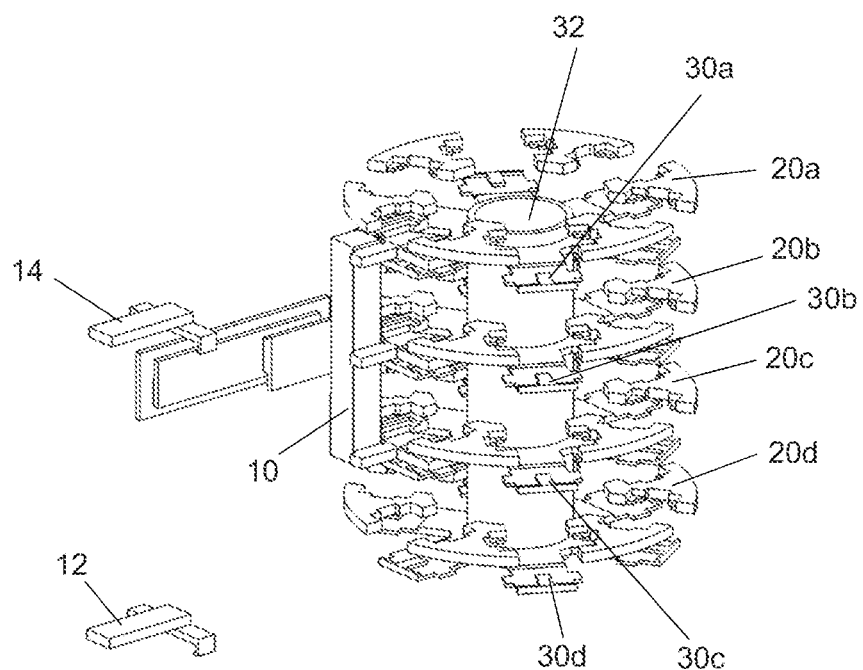
Figure 11:
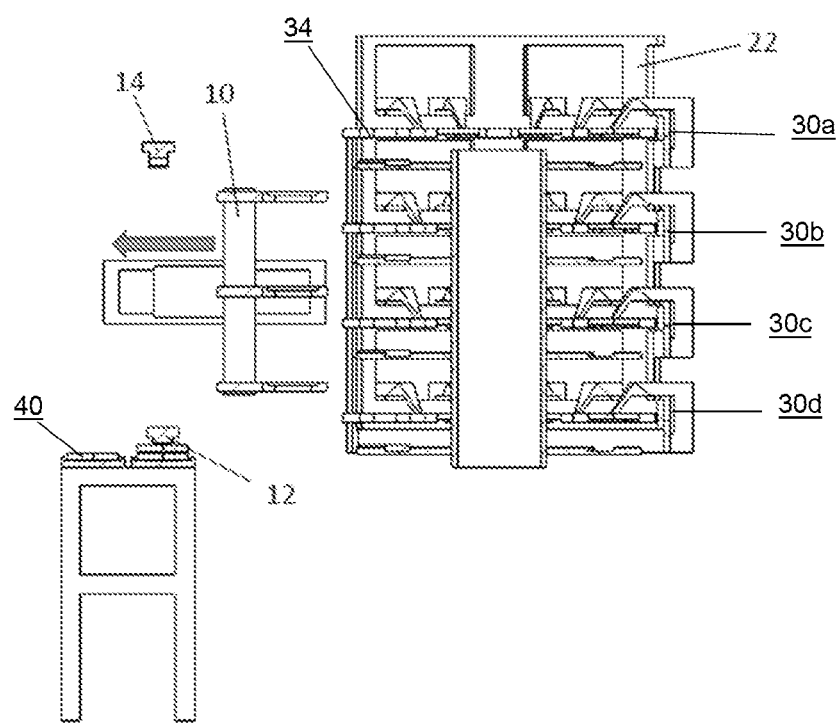

FIG. 4e is a perspective view showing the vertical walking beam 10 moving the products into the carousel 100 in accordance with the present invention. As shown in FIG. 11, the vertical walking beam 10 moves into the carousel 100 and moves its gripper directly above the rotating platform 30.

Figure 4F:
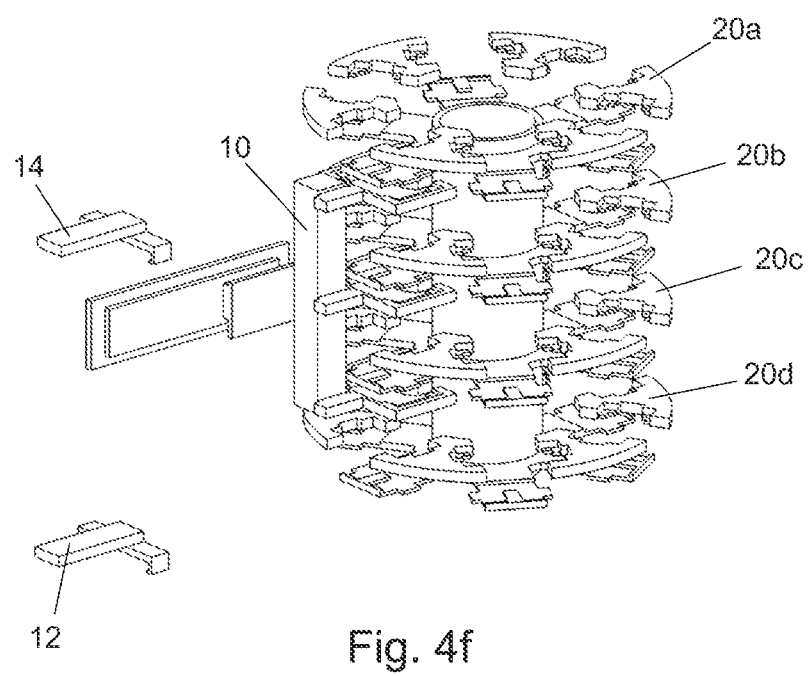
Figure 4G:
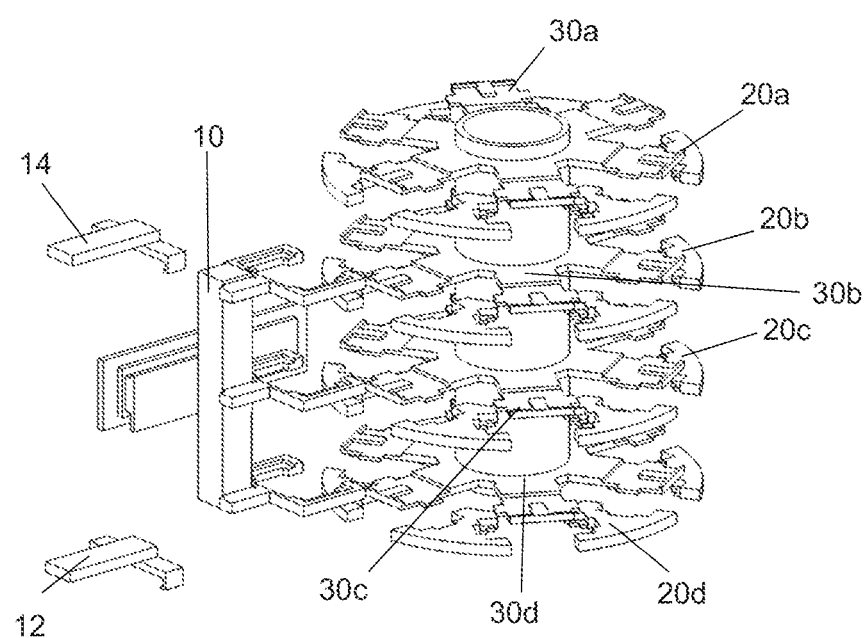
Figure 12:
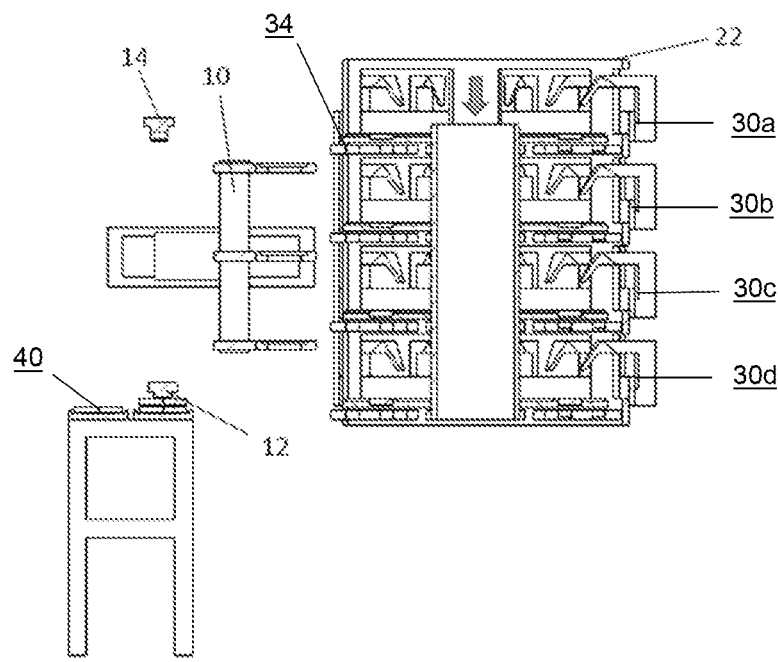

FIG. 4f is a perspective view showing the vertical walking beam 10 lowering the products onto the rotary platforms 30 of the present invention. In FIG. 12, the vertical walking beam 10 lowers the products onto the rotating platform 30 and further lowers beneath the rotating platform 30. FIG. 4g is a perspective view showing the vertical walking beam 10 moving to its home position and the vertical moving platform 30 lowering to place products onto rotary platform 30 in accordance with the present invention.

As shown in FIG. 4g, the vertical walking beam 10 moves out of the carousel 100 and returns to its home position. All products in the transfer zone 34 of the carousel 100 are now in position and ready to be indexed to the first working station 28 at its respective level.

Figure 5:
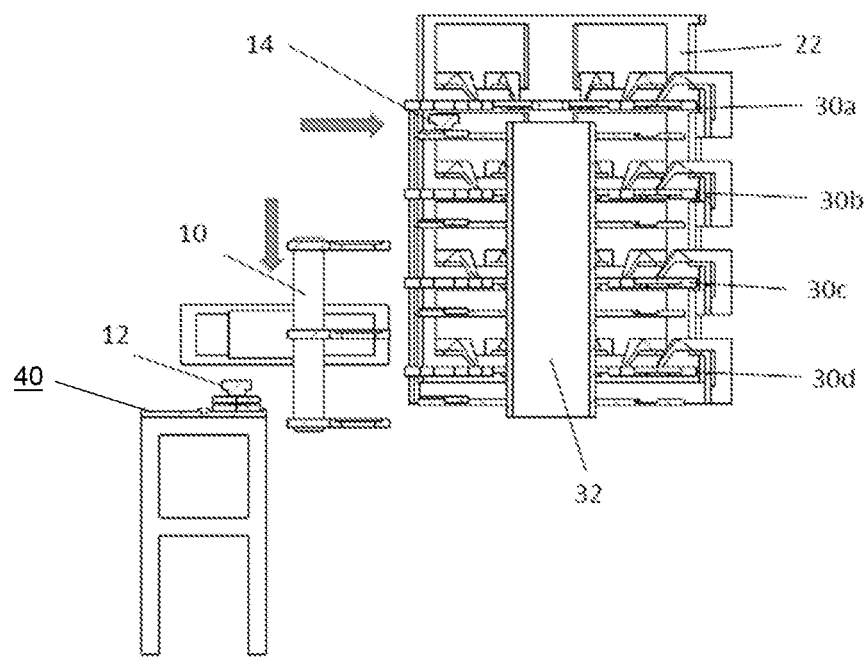
FIGS. 5 to 14 illustrates in sections views of loading of product for processing and unloading of processed products of the high density manufacturing cell in accordance with the present invention.

FIG. 5 is a section view showing the unload gripper 14 picking a completed/processed product from the top most rotary platform 30a and the vertical walking beam 10 positioning the gripper below the lower tier of the rotary platforms 30b-30d in accordance with the present invention. As shown, the unload gripper 14 enters the carousel 100 to pick up a completed/processed product from the top most rotary platform 30a.

Figure 6:
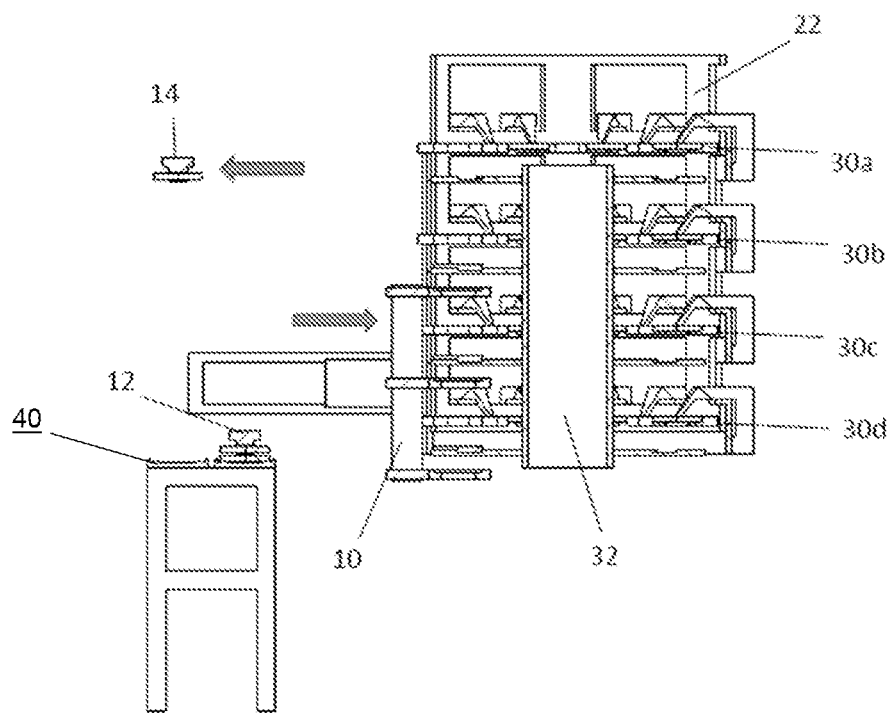

FIG. 6 is a section view showing the unload gripper 14 moving a completed/processed product to a conveyor 40 (as shown in FIG. 1b) and the vertical walking beam 10 moving into the carousel 100 of the present invention. As shown in the figure, the unload gripper 14 removes a completed/processed product from the top level of the rotary platform 30a and places the product onto the conveyor 40, as shown in FIG. 1b. The vertical walking beam 10 positions its grippers directly beneath the bottom tier of the rotary platforms 30b-30d in accordance with the present invention.

Figure 7:
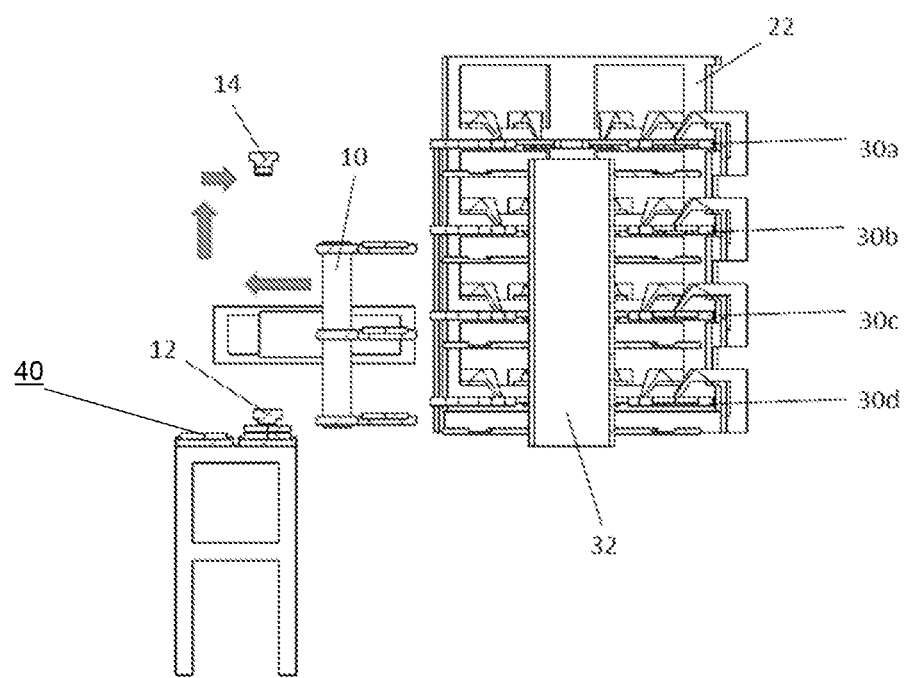

FIG. 7 is a sectional view showing the vertical walking beam 10 moving the products out of the lower tier platforms out of the carousel 100, while the unload gripper 14 returns to its home position.

Figure 8:
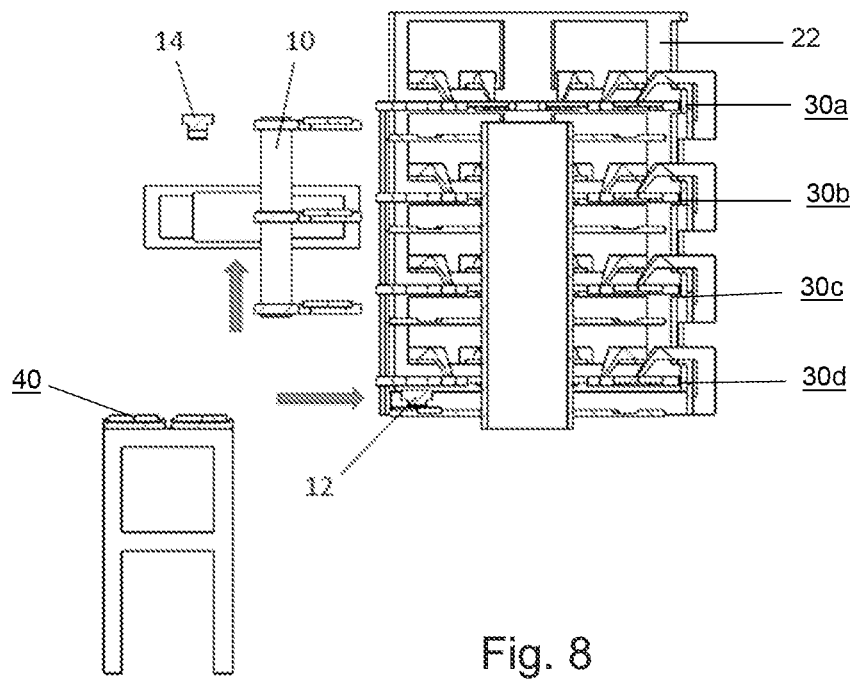

FIG. 8 is a section view showing the vertical walking beam 10 moving up to the upper tier of the carousel 100 and the load gripper 12 placing an unprocessed product into the carousel 100 in accordance with the present invention. The vertical walking beam 10 position its arms above the rotary platform 30a-30c. The load gripper 12 moves into the carousel 100 with the unprocessed product and places onto the bottom most level of the rotary platforms 30d.

Figure 9:
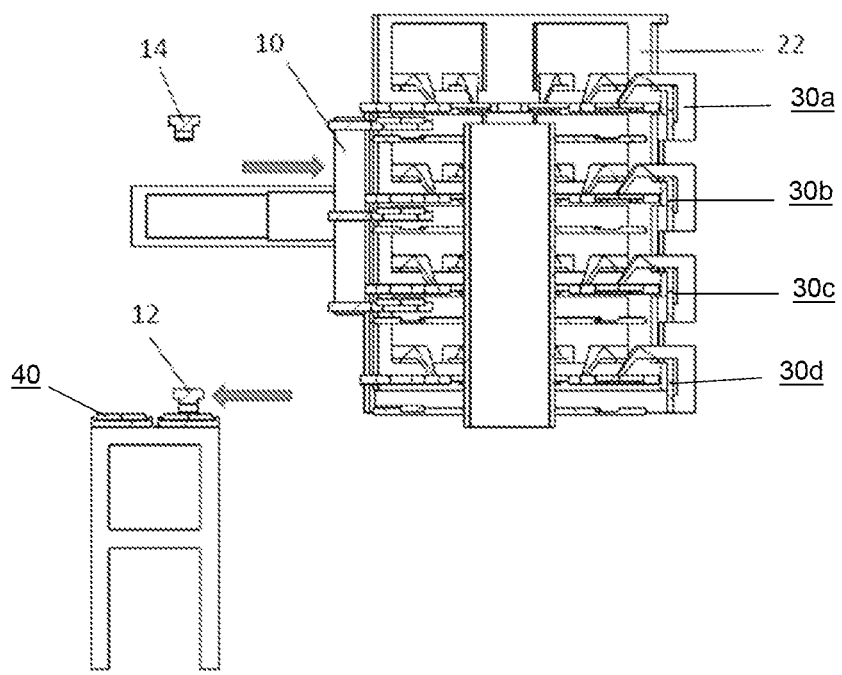

FIG. 9 is a section view of the vertical walking beam 10 moving into the upper tier of the carousel while the load gripper 14 moving out of the carousel 100 to the conveyor 40 to prepare a new part and moves to the standby position in accordance with the present invention.

Figure 10:
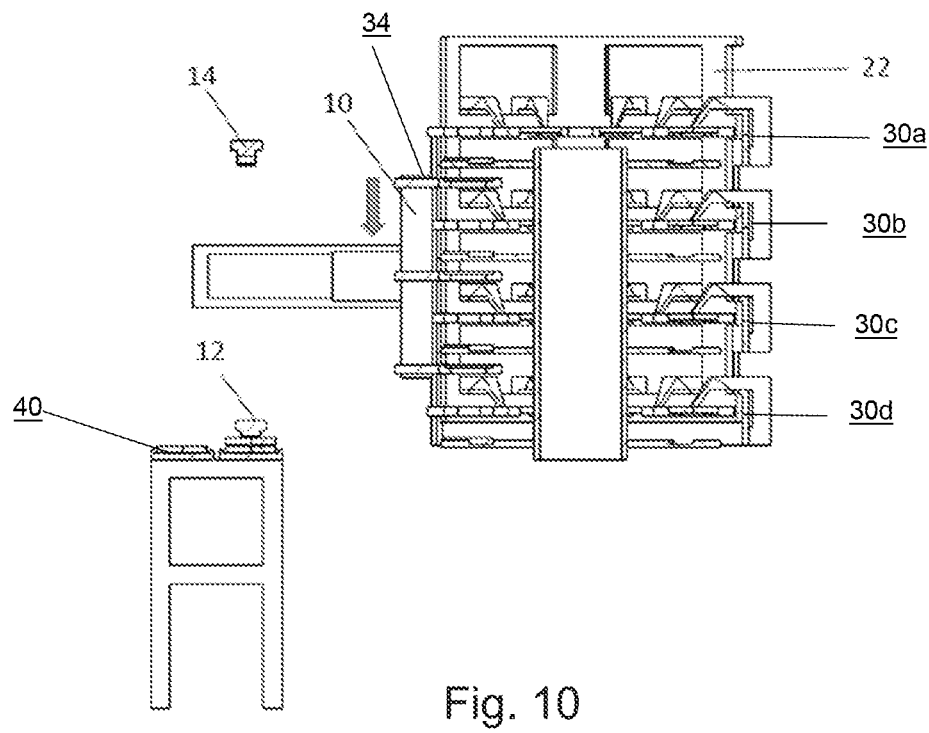

FIG. 10 is a section view of the vertical walking beam 10 placing products onto the rotary platforms 30a-30d. The vertical walking beam 10 lowers and places the product onto the rotary platform 30a-30d.

FIG. 11 is a vertical walking beam 10 moving out of the carousel 100 and into the standby position in accordance with the present invention. As shown in the figure, the vertical walking beam 10 moves its grippers out of the carousel 100 and to its standby position. The transfer zone 34 now has a new parts at each level ready for processing.

FIG. 12 is a section view showing the vertical moving platform 20a-20d lowering the products onto the rotary platforms 30a-30d of the present invention. The vertical moving platform 20a-20d lowers the products on the rotary platform 30a-30d.

Figure 13:
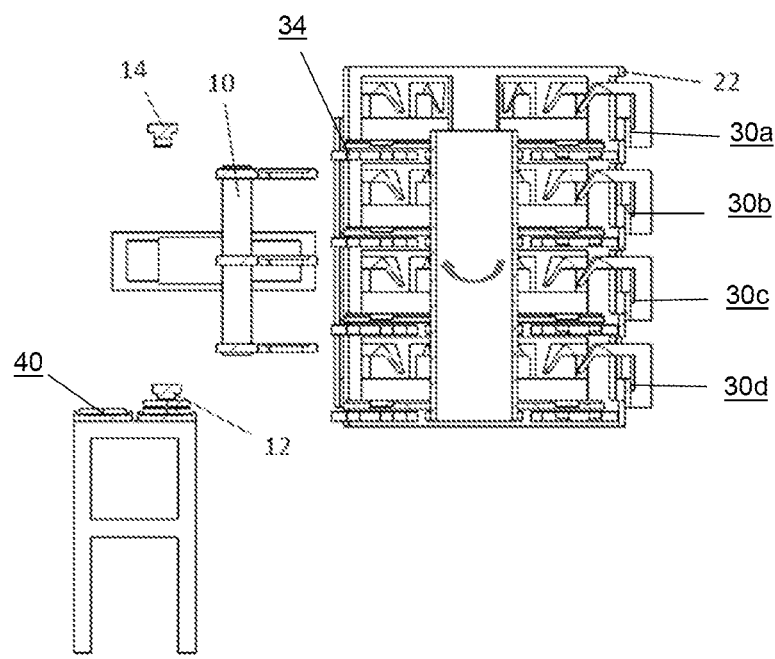

FIG. 13 is a section view showing the rotary platforms 30a-30d making an index in accordance with the present invention. The making of an index is to move all the products directly beneath the next adjacent work station 28.

Figure 14:
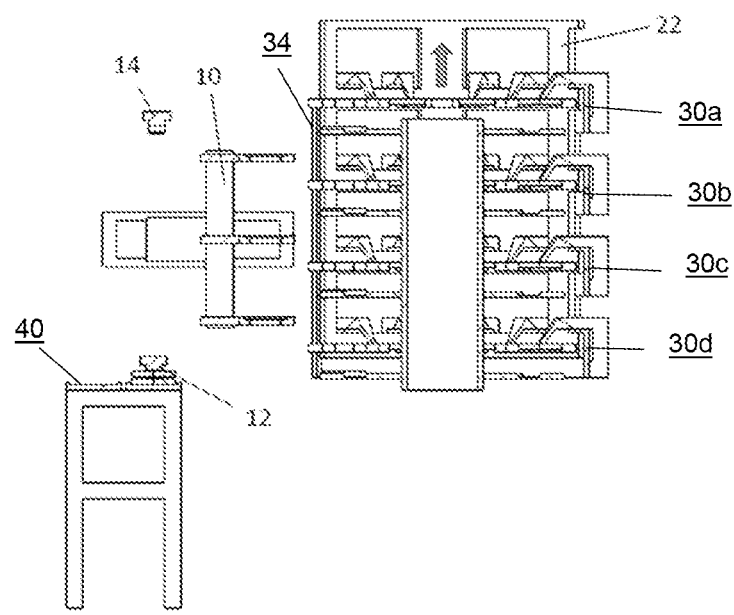

FIG. 14 is a section view showing the vertical moving platform 20 lifting all the products except those on the transfer zone 34, towards their respective work station 28 in accordance with the present invention. As shown in the figure, the vertical moving platform 20 raises and lifts all the products to the next work station 28, while leaving all the products within the transfer zone 34 to be transferred.

In accordance with the preferred embodiment of the present invention, the work stations 28 are positioned directly above the vertical moving platforms 30, and are spaced evenly at a similar pitch as the product on the vertical moving platforms 20 and the rotary platforms 30. The conveyor 40 is placed beside the carousel 100, at the end stroke of the load and unloading grippers 12, 14, opposite of the transfer zone 34. The transfer process of products is triggered after the vertical moving platforms 20a-20d are in the up position. As the units within the transfer zone 34 of the vertical moving platforms 20a-20d do not have features to pick up products, products on the transfer zone 34 remains on the rotating platform 30a-30d as the vertical moving platform 20a-20d move upwards.

In accordance with the present invention, upon completion of all the processing steps within the stations of the carousel 100, the vertical moving platforms 20a-20d are being lowered, and place all the processed products onto the rotary platforms 30a-30d. The vertical moving platforms 20a-20d will continue to lower below the rotary platforms 30a-30d to clear away from the rotary platforms 30a-30d. The rotary platforms 30a-30d are then rotated by an angular pitch. All products within the carousel 100 are now in a new position and ready for subsequent processing step to be performed. The vertical moving platforms 20a-20d will then move upwards, lifting all products, except for those in the transfer zone 34, away from the rotary platforms 30a-30d and continue moving, until the products are within the working envelope of their respective work stations 28. All work station 28 will begin their respective processes and the transferring of products begins concurrently at the transfer zone 34.

The rotary platforms 30a-30d are fixed to a cylindrical shaft 32. The cylindrical shaft 32 has a rotary mechanism (not shown) used to rotate the platforms 30a-30d with a desired motion profile. The type of rotating mechanism is selected depending on the size and weight of the rotating mass as well as the desired motion profile. The rotation of the shaft can be achieved with an indexing mechanism, gears and other means of indirect power transmission mechanisms or through direct methods of direct motor coupling. In the preferred embodiment of the present invention, the picking of products includes the use of mechanical or magnetic grippers, vacuum cups or other forms of part handling end effectors.

In the present invention, the vertical moving platforms and rotary platforms may be configured to be lifted and rotated independently or grouped to allow flexibility of processing products, and the vertical walking beam may include the use of linear actuators installed with independently driven grippers to move products independently across platforms. The number of transfer zones may be modified to have two or more to allow cells to be linked together and the cell can be operated individually along a conveyor or a plurality of cells may be linked together to form a cluster of manufacturing processes. Independent robots or actuators can be used to form and the load gripper and unload gripper into the carousel and to retract the load gripper and unload gripper from the carousel, and a robot or actuator is used to raise or lower the load and unload grippers within the carousel.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention.

Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A high density manufacturing cell for optimizing floor space usage to reduce equipment footprint and material travel path comprising
   (a) a plurality of rotary platforms having one end being attached to a rotatable shaft positioned in the middle of the cell and being rotatable about the central axis thereof;
   (b) a plurality of vertical moving platforms being mounted substantially perpendicularly to an external cylindrical housing, wherein the cylindrical housing can be moved vertically upwards and downwards;
   (c) a vertical walking beam located next to the cylindrical housing of the manufacturing cell, said beam having a number of arms of a quantity one less than number of platforms, said arms lifting a new product for processing and to place down a completed product from the cell for transferring of products between platforms;
   (d) an unload gripper and a load gripper positioned at the topmost and bottommost platform to load products into the cell for processing and to unload processed products from the rotary platforms to a conveyor positioned next to or beside the walking beam.

2. The high density manufacturing cell as set forth in claim 1, wherein a plurality of work stations are positioned above the vertical moving platform, for the processing of products transferred thereto.

3. The high density manufacturing cell as set forth in claim 2, wherein the vertical moving platform lifts up in progress products above the rotary platform and towards the work station to be processed.

4. The high density manufacturing cell as set forth in claim 1, wherein the vertical moving platform is provided with a plurality of load grippers and unload grippers.

5. The high density manufacturing cell as set forth in claim 1, wherein the rotatable shaft rotates to drive the rotating platforms.

6. The high density manufacturing cell as set forth in claim 1, wherein the conveyor is used to deliver products to the cell for processing or to transfer processed products away from the cell.

7. The high density manufacturing cell as set forth in claim 1, said arm places products onto the rotary platform or pick products from the rotary platform.

8. The high density manufacturing cell of claim 1, wherein the vertical moving platforms and rotary platforms are configured to be lifted and rotated independently or grouped to allow flexibility of processing products.

9. The high density manufacturing cell of claim 1, wherein the vertical walking beam includes the use of linear actuators installed with independently driven grippers to move products independently across platforms.

10. The high density manufacturing cell as set forth in claim 1, wherein the cell is operated individually along a conveyor or a plurality of cells are linked together to form a chain or cluster of process cells.

11. A method of loading and unloading processed product using the high density manufacturing cell of claim 1 comprising the steps of:
   (i) moving downwards the vertical moving platforms with the unload gripper while the unload gripper moves into the cell to retrieve the processed part from the top most rotary platform;
   (ii) moving the vertical walking beam with the load gripper to the bottom tier of the rotary platform and enter the cell to retrieve products from the bottom tier platforms;
   (iii) returning the unload gripper to the original position thereof after the unload gripper places the processed products onto the conveyor;
   (iv) moving the vertical walking beam to position the unload gripper to the upper tier platform, and while the load gripper is holding on to a new unprocessed product from the conveyor, moving it into the cell to place the product on the bottom most rotary platform;
   (v) moving the vertical moving platform into the cell to place the partially processed products on to the top tier rotary platforms and moving the load gripper to the conveyor to pick a new product to prepare for the next loading operation;
   (vi) returning the vertical walking beam to the standby position;
   (vii) lowering the vertical moving platform to place all parts on to the rotary platform moving all products on the rotary platform by an angular index to transfer products to the next adjacent workstation, where the work stations are housed on an independent external cylindrical housing; and
   (viii) moving the vertical moving platform upwards to lift the products for processing.

12. The method of loading and unloading processed product as set for in claim 11, wherein the process of product transferring and product processing is performed simultaneously.

13. The method of loading and unloading processed product as set forth in claim 11, wherein the vertical moving platform moves all the products, except for the products in a transfer zone, away from the rotary platforms.

14. The method of loading and unloading product as set forth in claim 11, wherein the angular spacing between workstations is similar to the product holders of the rotary and vertically moving platform.

15. The method of loading and unloading as set forth in claim 14, wherein the work station is provided with station tools to perform a dedicated process.

16. The method of loading and unloading product as set for in claim 11, wherein the load gripper and the unload gripper is mechanical operated, magnetic operated, or vacuum operated.

* * * * *